United States Patent [19]
Thompson et al.

[11] Patent Number: 6,050,035
[45] Date of Patent: Apr. 18, 2000

[54] UNITIZED SEISMIC BRACKET

[75] Inventors: William J. Thompson, Fullerton; Keith L. Watkins, Yorba Linda, both of Calif.

[73] Assignee: Tomarco Contractor Specialties, Inc., Buena Park, Calif.

[21] Appl. No.: 09/161,968

[22] Filed: Sep. 28, 1998

[51] Int. Cl.[7] ....................................................... E04B 1/38
[52] U.S. Cl. ............................... 52/167.1; 52/713; 52/39; 248/59; 248/351; 248/638; 403/71; 403/119; 403/220; 403/260
[58] Field of Search ............................ 52/39, 713, 167.1; 403/71, 119, 209, 220, 243, 260, 262; 248/59, 351, 354.1, 638

[56] References Cited

U.S. PATENT DOCUMENTS

| | | | |
|---|---|---|---|
| 1,132,999 | 3/1915 | Beers | 248/59 X |
| 4,065,218 | 12/1977 | Biggane | 403/71 |
| 4,078,752 | 3/1978 | Kindorf | 248/59 X |
| 5,145,132 | 9/1992 | Kirschner | 248/59 |
| 5,188,317 | 2/1993 | Roth | 248/59 |
| 5,307,752 | 5/1994 | Perrault et al. | 248/59 X |
| 5,412,843 | 5/1995 | Krongauz et al. | 52/713 X |

*Primary Examiner*—Pamela Hanthowe
*Assistant Examiner*—Brian E. Glessner
*Attorney, Agent, or Firm*—Price, Gess & Ubell

[57] ABSTRACT

A seismic brace having a brace arm for fastening to a support rod on one end and a structural portion of a building, on the other end, is attachable to the support rod without disconnecting it by a base bracket hinged to the brace arm and a locking bracket hinged to the brace arm or the base bracket to overlay the base bracket. Both the base bracket and locking bracket have a slot extending from an edge towards the middle with one slot offset form the other by ninety degrees (90°).

10 Claims, 2 Drawing Sheets

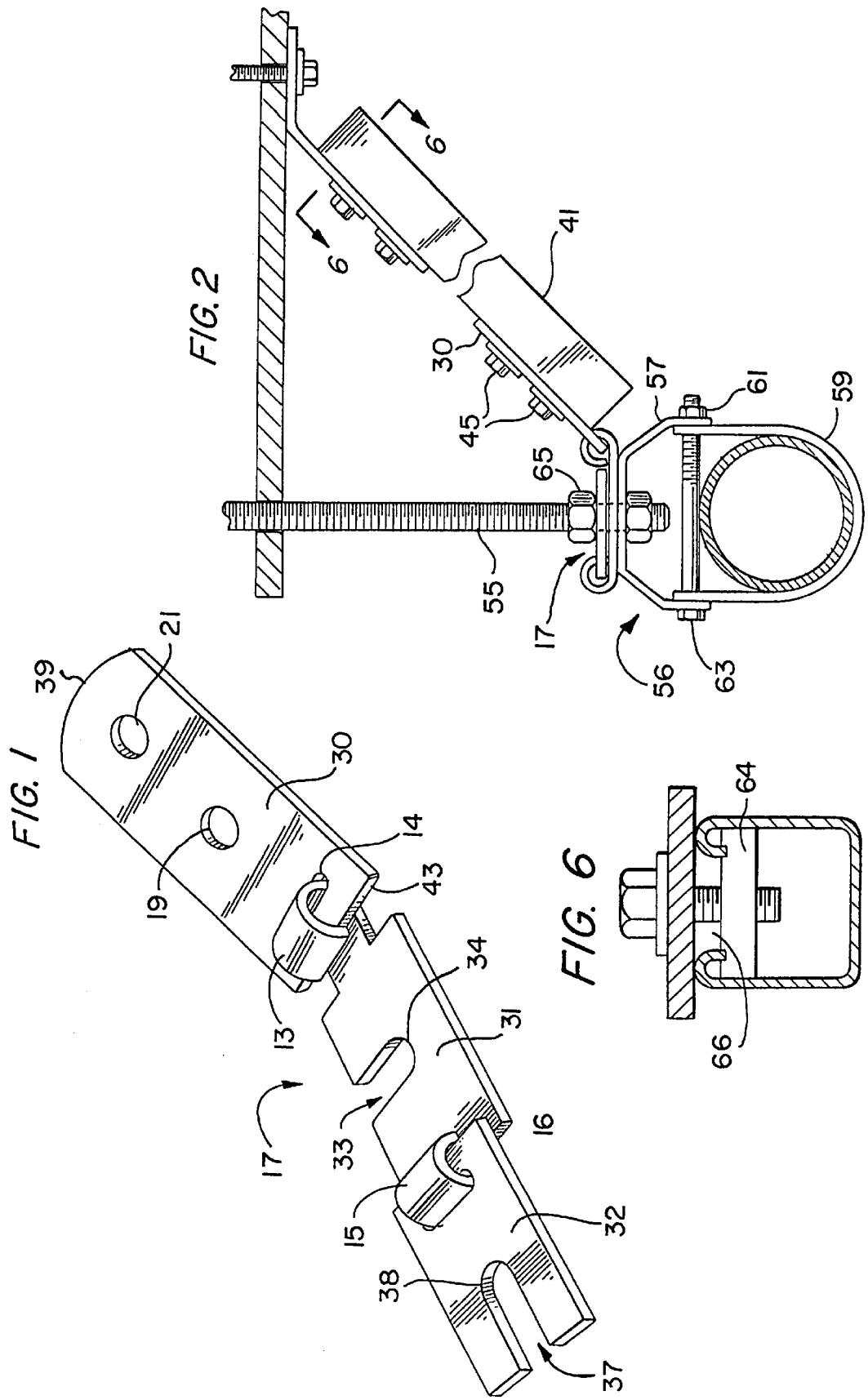

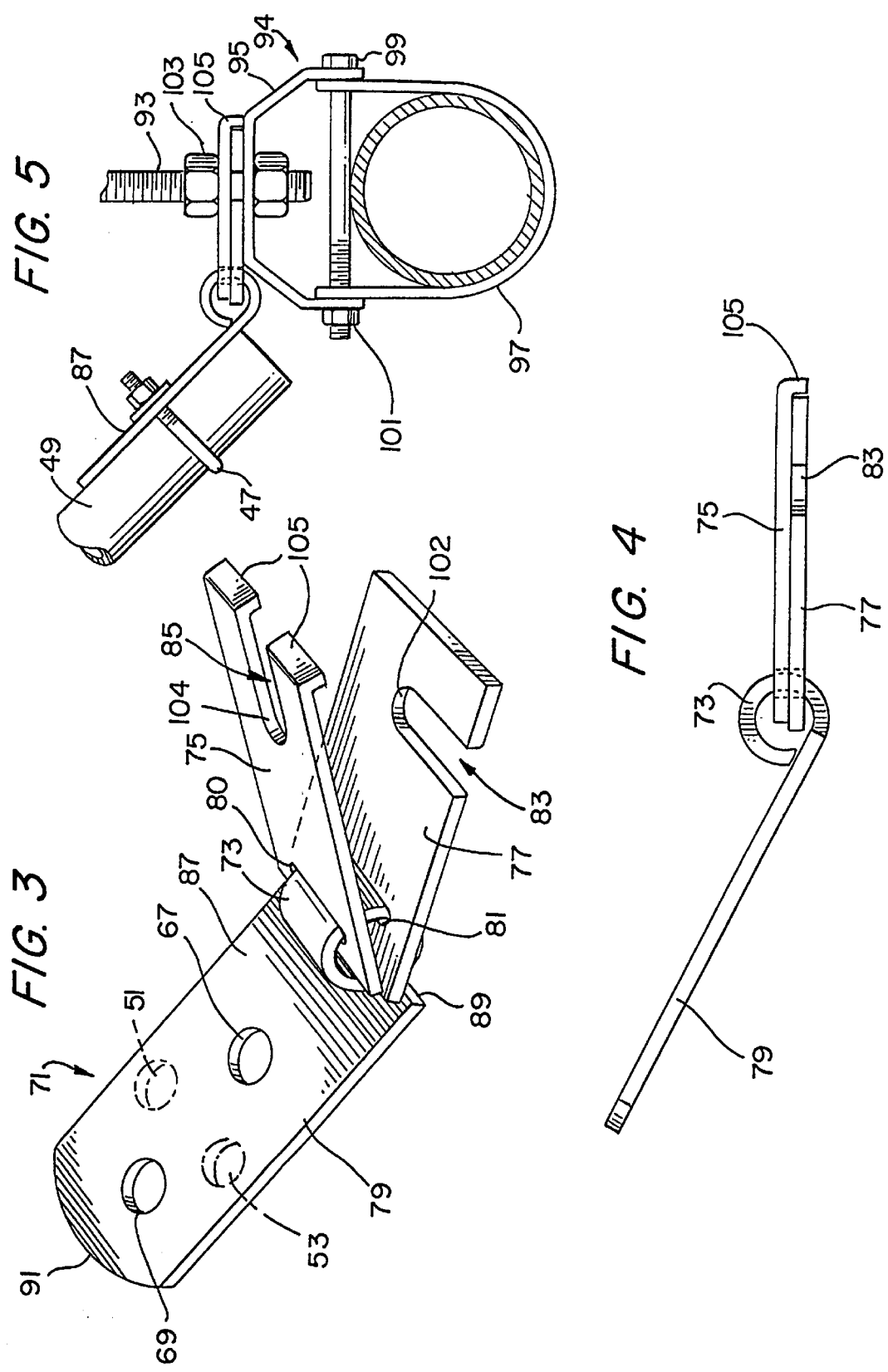

UNITIZED SEISMIC BRACKET

BACKGROUND OF THE INVENTION

1. Field of the Invention

Today's commercial buildings use hangers suspended by rods from the underside of the floor above to run pipes, electrical cables, HVAC ducts, communication lines, etc. A seismic brace is used in buildings to prevent adverse sway or movement in the event of an earthquake. Those braces keep the various independent elements of such suspended items within a building intact during an earthquake. Without seismic brackets, the independent elements, like pipe hangers, for example, will move independently. This independent movement can result in the pipes suspended in these hangers to break away from their installed positions causing damage or at least inoperable conditions.

2. Description of Related Art

Various different types of seismic braces are in current use, each having multiple parts or requiring various degrees of effort and time to install. For example, U.S. Pat. No. 4,065,218 shows a one piece seismic brace having a first channel iron that connects to a building element hinged to a second channel iron which attaches to the item supported. This brace takes considerable time to install because the fastener of the supported element must be completely undone to attach this brace.

U.S. Pat. No. 5,188,317 shows a brace for a hanger for pipes, electrical cables or the like. The hanger is suspended from a series of rods attached to the overhead floor. This brace uses a separate detached interlock element so that the brace may be attached to the rod without completely removing a hanger from its supporting rod. The interlock element must mate with the rod connecting end in a precise manner to function correctly. Incorrect use of the detached interlock piece, use of an incorrectly sized interlock piece, or simply not using it, will result in insufficient restraint or the brace coming loose during earthquake induced movement.

None of the prior art seismic braces achieve or fulfills the purpose of the present invention in providing a one piece seismic connector with an integral, built-in interlock construction that does not require disconnecting the hanger from its support rod to attach the connector end to the rod.

SUMMARY OF THE INVENTION

The present invention relates to a one piece bracket used to construct a brace assembly which is applied to a hanging support system for utility and service lines to prevent or eliminate the oscillations that develop in such hanging systems when subjected to earthquakes or various types of natural or man-made vibrations. A brace arm is attached to a base bracket by a hinge. A locking bracket is hinged to the base bracket at either end of the base bracket. The base bracket and locking bracket are slotted in different directions to capture vertical support rods. The slots are open ended, and oppose each other at a right angle. When the two brackets overlap they capture the vertical support rod. The one piece brace of the present invention attaches to an already installed system without disassembly of the hanger. Due to the unitized construction of the bracket, ease of assembly, inability to lose a detached piece and correct connection of the brace to the rod, are answered.

BRIEF DESCRIPTION OF THE DRAWINGS

Further aspects of the invention will be apparent when the description and claims set forth below are considered in conjunction with the accompanying drawings, in which like-reference numerals depict like part throughout the drawings; and FIG. 1 is a perspective view of a one piece seismic brace of the present invention;

FIG. 2 is a side elevation of the one piece seismic brace;

FIG. 3 is a perspective view of an alternate embodiment of the one piece seismic brace of the present invention;

FIG. 4 is a partial sectional view of the one piece seismic brace of FIG. 3;

FIG. 5 is a side elevational view of the one piece seismic brace of FIG. 3; and

FIG. 6 is a cross-sectional view of the element in FIG. 2.

DETAILED DESCRIPTION OF THE PREFERRED EMBODIMENTS

The following description is provided to enable any person skilled in the art to make and use the invention and sets forth the best modes, contemplated by the inventor, for carrying out his invention.

The particular invention is intended for use with suspended utility systems, including, but not limited to, individual pipes and conduit, pipe racks and conduit racks, cable trays, bus ducts, HVAC ducts, mechanical equipment, fans and ceiling grids and is specifically intended to provide seismic restraint of these systems.

As shown in FIG. 1, a seismic brace 17 according to the present invention has a force transmitting member brace arm 30 attached by hinge 13 to base bracket 31 which is attached to locking bracket 32 by hinge 15. The hinge 13 enables the brace arm 30 to sit at a range of angles with respect to the plane containing the base bracket 31. Thus, the brace 17 is not restricted to one particular angle per connector. The hinge 15 secures the locking bracket 32 to the attachment member ensuring that all parts of the brace 17 are present during installation. The base bracket 31 supports two rectangular configured flexable member, which are preferably hinge loops 13, 15 or the like. Once the hinge loops 13, 15 are extended through the slots 14, 16, they are bent in a circular manner continuing until their edges are located away from the slots and nearly abut the surface or are welded to the surface of the base bracket. Rod receiving slots 33, 37 on both the base brackets 31 and the locking bracket 32 are cut or punched out with at least a width sufficient to receive a rod 55 therein. The brace arm 30 has generally rectangular configuration having a substantially continuous planar surface 34 with at least a pair of holes 19, 21 for attaching the brace 17 to a channel member 41. (FIG. 2). The holes 19, 21 are equally spaced in the longitudinal direction between the corresponding distal edges 39, 43 of the brace arm and are centered in a lateral and transverse direction.

In FIG. 2, the brace 17 is shown completely installed, attached to a rod or bolt 55 which connects the brace 17 to the upper part of a hanger member 56. The upper part 57 of the hanger member 56 at the outer end of the upper part 57 is securely fastened to a lower part 59 of the hanger member 56 at an outer end of the upper pad 57 by a nut 61 and a cross bolt 63. The bracket arm 30 of the brace 17 extends upward in order to attach the brace 17 to the channel 41. The brace 17 is fastened to the interconnecting channel 41 by a pair of nut and bolt combinations 45, whereby each of the bolts is passed through each of the holes 19, 21 of the arm bracket 30 to be received by similar pair of holes in the channel 41 or as depicted in FIG. 6, by channel nuts 64 within the open throat 66 of the channel 41. Each of the bolts is secured by nuts which are tightened to secure the one end of the brace 17 to the channel 41. Each of the bolts is secured by nuts which are tightened to secure their one end of the brace 17 to the channel 41.

On the other end of the brace 17, the base bracket 31 with its connector slot 33 is slid underneath a loosened nut 65 adjacent to the support rod 55 until the distal end 34 of slot 33 abuts the rod 55. Once orientated, the locking bracket 32 folds to overlap the base bracket 31. In this position, the distal end 38 of slot 37 in locking bracket 32 abuts the support rod 55 thereby securing the rod 55. The nut 65 is then tightened to further secure the support rod 55 in place.

As shown in FIG. 3, an alternative embodiment of a brace 71 according to the present invention has a single flexible member, preferably a hinge 73 or the like, that connects the bracket arm 79 to the base bracket 77 and the locking bracket 75. The hinge 73 enables the bracket arm 79 to sit at a range of angles with respect to the plane containing the base bracket 77. Thus, the brace 71 is not restricted to one particular angle per connector. The hinge 73 connects the locking bracket 75 to the base bracket 77 ensuring that the brace is effectively one piece. The bracket arm 79 has one rectangular configured hinge forming member 73. Once the hinge forming member 73 is extended through the slot 81 of the base bracket 77 and the slot 80 of the locking bracket 77 and the bracket arm 79, respectively, are cut or punched each with at least a width sufficient to receive the hinge 73 therein. The bracket arm 79 has a rectangular configuration having a substantially continuous planar surface 87 with a pair of holes 67, 69 for attaching the brace 71 to a channel member 49 (FIG. 5). The pair of holes 67, 69 are equally spaced in the longitudinal direction between the corresponding distal edges 89, 91 of the force transmitting member and centered in a lateral and transverse direction.

As shown in FIG. 5, the brace 71 is attached to a rod or bolt 93 which connects the brace 71 to the upper member 95 of the hanger 94. The upper member 95 is securely fastened to the lower member 97 at an outer end of the upper member 95 by a nut 101 and a cross bolt 99. The bracket arm 79 of the brace 71 extends upward in order-to attach to a tubular member 49 of metal or plastic. The brace 71 is alternatively fastened to the interconnecting tubular member 49 using a U-bolt 47 connection. In order to use the U-bolt 47, the brace 71 has a second pair of alternatively positioned holes 51, 53 (FIG. 3). On the other end of the brace 71, the base bracket 77 with its connector slot 83, is attached by sliding it underneath a loosened nut 103 adjacent to the rod 93 until the distal end 102 of slot 83 abuts the rod 93. Once orientated, the locking bracket 75 folds over to overlap the base bracket 77. Subsequently, the distal end 104 of connector slot 85 abuts the rod 93 causing the locking bracket 75 to secure the rod 93. The locking bracket 75, positioned between the base bracket 77 and nut 103, further secures the rod 93 when the nut 103 is sufficiently tightened. The distal end of the locking bracket 75 may be bent at a right angle to the locking bracket 75 to form a clasp 105 to insure against even the slightest rotational movement of the locking bracket 75 with respect to the base bracket 77.

Having illustrated and described a preferred embodiment as well as variants of this invention, it will be obvious to those skilled in the art that further changes and modifications may become apparent. Such changes and modifications are not to affect this instant concept and are to be considered within the scope of this invention.

What is claimed is:

1. A brace to prevent sway between a support and a structure during movement of the structure and support from seismic activity, the brace comprising:

a brace arm having a first and second end, wherein the first end is adapted to extend from the support, and the second end is adapted to connect the brace arm to an element which is connected to the structure;

a base bracket, having a first and second end, flexibly and permanently attached to the first end of the brace arm by its first end, said base bracket having an opening extending from an edge towards a center of the base bracket; and a locking bracket, having a first and second end, flexibly and permanently attached to the second end of the base bracket by its first end, said locking bracket having an opening therein extending from an edge towards a center of the locking bracket, whereby when the locking bracket overlays the base bracket, the opening of the locking bracket and the base bracket form an opening which is adapted to completely enclose the support.

2. The brace of claim 1 wherein the opening in said base bracket is a slot having a width wherein the width is adapted to be slightly larger than the diameter of the support and wherein the opening in said locking bracket is a slot having a width wherein the width is adapted to be slightly larger than the diameter of the support and wherein the main axis of the slot is at ninety degrees to the main axis of the slot in the base bracket.

3. The brace of claim 1 wherein the base bracket is flexibly and permanently attached to the brace arm by a hinge arrangement formed out of the base bracket and brace arm, and wherein the locking bracket and base bracket are flexibly and permanently attached by a hinge arrangement formed out of the locking bracket and base bracket.

4. The brace of claim 3 wherein the opening in said base bracket is a slot having a width wherein the width is adapted to be slightly larger than the diameter of the support and wherein the opening in said locking bracket is a slot having a width wherein the width is adapted to be slightly larger than the diameter of the support and wherein the main axis of the slot is at ninety degrees to the main axis of the slot in the base bracket.

5. A brace to prevent sway between a support and a structure during movement of the structure and support from seismic activity, the brace comprising:

a brace arm having a first and second end, wherein the first end is adapted to extend from the support, and the second end is adapted to connect the brace arm to an element which is connected to the structure;

a base bracket, having a first and second end, flexibly and permanently attached to the first end of the brace arm, by its first end, said base bracket having an opening extending from an edge towards a center of the base bracket; and a locking bracket, having a first end and second end, flexibly and permanently attached to the first end of the brace arm, by its first end, said base bracket having an opening extending from an edge towards a center of the locking bracket;

wherein when the locking bracket overlays the base bracket, the opening of the locking bracket and the opening of the base bracket form an opening which is adapted to completely enclose the support.

6. The brace of claim 5 wherein the opening in said base bracket is a slot having a width wherein the width is adapted to be slightly larger than the diameter of the support and wherein the opening in said locking bracket is a slot having a width wherein the width is adapted to be slightly larger than the diameter of the support and wherein the main axis at ninety degrees to the main axis of the slot in the base bracket.

7. The brace of claim 5 wherein the base bracket is flexibly and permanently attached to the brace arm by a hinge arrangement formed out of the base bracket and brace arm, and wherein the locking bracket and brace arm are flexibly and permanently attached by a hinge arrangement formed out of the locking bracket and brace arm.

8. The brace of claim 7 wherein the opening in said base bracket is a slot having a width wherein the width is adapted to be slightly larger than the diameter of the support and wherein the opening in said locking bracket is a slot having a width wherein the width is adapted to be slightly larger than the diameter of the support and wherein the main axis at ninety degrees to the main axis of the slot in the base bracket.

9. The brace of claim 7 further comprising a clasp at the second end of the locking bracket to engage the second end of the base bracket.

10. The brace of claim 9 wherein the opening in said base bracket is a slot having a width wherein the width is adapted to be slightly larger than the diameter of the support and wherein the opening in said locking bracket is a slot having a width wherein the width is adapted to be slightly larger than the diameter of the support and wherein the main axis at ninety degrees to the main axis of the slot in the base brackets.

\* \* \* \* \*